Feb. 16, 1943.  V. P. GERSHON  2,311,532
LIQUID TREATMENT APPARATUS
Filed Aug. 12, 1939
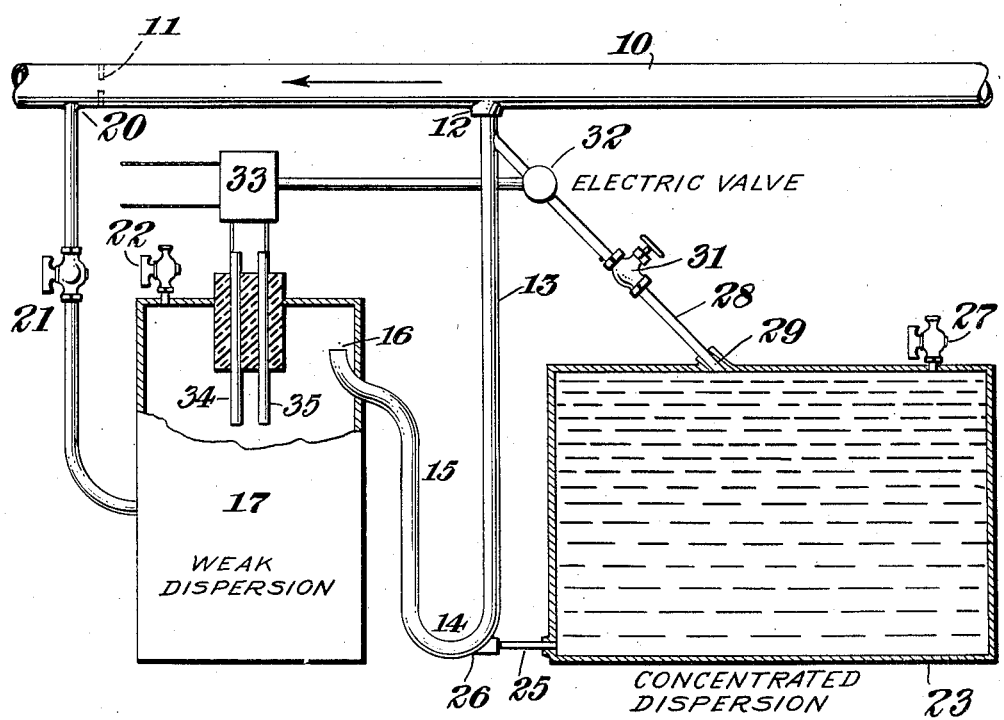
Inventor.
Victor Paul Gershon Patented Feb. 16, 1943

2,311,532

UNITED STATES PATENT OFFICE 2,311,532

LIQUID TREATMENT APPARATUS

Victor Paul Gershon, New York, N. Y.

Application August 12, 1939, Serial No. 289,859

1 Claim. (Cl. 210—18)

This invention relates to methods of and apparatus for treating a fluid; and it comprises a process wherein a flow of fluid in a conduit is continuously treated with a small predetermined amount of another substance, said treatment being of a portion of said flow diverted for that purpose; and it further comprises an apparatus particularly suitable for feeding a small quantity of "treatment substance" to the main fluid, whereby the amount of said "treatment substance" is automatically proportional to the amount of fluid flowing; all as more fully hereinafter set forth and as claimed.

There are many cases where it is desirable to treat a fluid with small amounts of "treatment substance" for one purpose or another. One example is the treatment of water flowing in a pipe with alkalized silicates or phosphates in order to diminish the corrosive and scale-forming properties of said water. In carrying out this treatment of water, in some localities only a few parts per million of the "treatment chemical" are required. It is recognized that a smaller amount is not as effective while an excess is costly and may impart a bad taste to the water. Consequently, accuracy in feeding the correct quantity of the "treatment chemical" becomes very important.

Heretofore such accuracy was obtainable by the use of complicated feeding devices which generally employed pumps, the operation of which were controlled by flow meters or other costly instruments. In the great majority of installations, these devices were considered too expensive and resort was made to cheaper and simpler "by-pass" feeders to which class the device employing the method of this invention belongs. The operation of the "by-pass" feeders previously used did not give the desired accuracy of feeding so that the predetermined ratio of the "treatment chemical" to the amount of the main fluid was not maintained.

In the broad aspect, one object of my invention is to provide an improved method and a feeding apparatus of the inexpensive "by-pass" type which shall utilize the above method to accomplish the addition of a "treatment chemical" in a predetermined ratio to the amount of the main fluid more accurately than has been possible heretofore by the use of any inexpensive type of feeder.

Another object of my invention is to effect the treatment in a dependable and safe manner so that the feeding device may require less frequent attention, thereby reducing the cost of servicing.

The inaccuracy of the previously used "bypass" methods is evidenced by actual experience and results from their method of operation which follows:

In the displacement type of "by-pass" feeder a small portion of the main flow is shunted into a by-pass in which is interposed a tank containing a heavy concentrated solution of the "treatment substance." The shunted fluid forces a small stream of the heavy solution through an opening at the bottom and into the main conduit. The action of the upper pressing fluid is similar to a piston in a cylinder. Because the lower "treatment solution" is very concentrated with respect to the active ingredient, the outlet valve at the bottom must of necessity be very small. In addition, this valve is generally set at such small opening that slight vibration, temperature variations or lodgment of particles of foreign matter cause serious changes in the available opening of the valve which has an immediate effect upon the amount of concentrated "treatment chemical" forced into the main conduit. This effect is directly proportional to the change in the available opening. Thus, if because of any of the above mentioned reasons, the valve opening is decreased to one-fourth of its set size, almost immediately the concentration of the chemical in the main flow is correspondingly reduced to one-fourth of the desired value. In addition, this displacement type of feeder is subject to further error caused by the diminishing height of the heavy solution as it is being used up. This diminishes the resistance which must be overcome although the force pushing on the body of the lower heavy solution remains constant for any particular amount of flow in the main conduit.

In a diffusion type of "by-pass feeder, the shunted liquid passes over the surface of a body of heavy concentrated solution of the "treatment chemical" which is contained in the interposed tank. Actually, this tank is initially filled about half full with the heavy solution and the upper half is filled with main fluid. As the "treatment chemical" is used up, the upper fluid space increases and (if the tank be cylindrical), the surface at the interface is diminished. This apparatus works really on both the diffusion and mixing principles, in that the heavy solution gives up its dissolved chemical to the upper fluid by agitation at the intersurface as well as by pure diffusion. This agitation is caused by waves and eddy currents set up by vibration, temperature changes and mostly by the turbulence of the current in the upper fluid stratum. In actual practice, we can consider that as fresh fluid enters the reservoir, it simultaneously displaces equal quantity of fluid at the other end, both inlet and outlet being located in the upper fluid stratum. The composition of the displaced fluid with regard to the active ingredient depends on all the above effects which are mostly unpredictable and, practically, no corrective measure can be taken to allow for the variations. Finally, variations in the composition of the upper fluid body have some effect upon the resistance to the flow so that since the composition is unpredictable and uncontrolled, this resistance is also of the same nature.

In the so-called bubbling type of "by-pass" feeder, the shunted fluid enters at or near the bottom of a body of heavy solution and rises through it reaching the space above its surface after dissolving out some of the active chemical from the solution. In this enriched condition, the shunted fluid passes back into the main flow. Practically, this method has all the defects of both the diffusion and the displacement methods and, in addition, this so-called bubbling through the heavy solution tends to destroy the separate identities of the two layers in the tank after which the action of the feeder is more seriously impaired.

In considering the main reasons why the above described "by-pass" methods have been inaccurate and undependable and why the method and device of the present invention avoid these defects, it is convenient to consider the following mathematical relation:

$$A = \phi ICR$$

In this equation,

A = amount of active ingredient injected.
$\phi$ = stands for function of, meaning that A can be expressed as some equation in terms of I, C and R.
I = the amount of flow of shunt.
C = percent of active ingredient in I.
R = the resistance to flow in the shunt.

As shown by the above descriptions of the older methods, it is seen that all terms I, C and R vary for these methods in an unpredictable manner. But it is the purpose of the new method and device of this invention to keep I and R both constant and dependable for any particular flow in the main flow and C constant for all flows.

One form of the new device employing the method of this invention is shown in the accompanying drawing.

The main flow passes through conduit 10 in the direction of the arrow. Orifice 11 is interposed in this conduit and actuates a flow through the by-pass emerging from the main conduit at 12, flowing through the loop 13, 14 and 15 and entering the displacement tank 17 at a point 16. This tank 17, in normal operation of the device, contains a dilute solution of the "treatment substance." The by-pass leaves the displacement tank at point 18 and returns to the main conduit at point 20. A control valve 21 is placed in the return branch of the by-pass. The displacement tank 17 is also provided with an air-release pet-cock 22.

A storage reservoir 23, intially charged with a concentrated solution or dispersion of the "treatment substance," is supplied with a small nipple 25 through which the said solution feeds into the loop at point 26. The very tip of 26 is located in the middle of the by-pass stream so that the small stream of the concentrated solution is readily dissolved in said by-pass stream. The reservoir is provided with an air-release pet-cock 27 and is in hydraulic balance with by-pass through small pipe 28 which connects the roof of the reservoir at opening 29 with a point 30 in the by-pass. The small pipe 28 is provided with a control valve 31 which is manually set and its setting not disturbed during the operation of the feeding device.

An electric solenoid valve 32 is interposed in the pipe 28 and is alternately opened and closed by an electric current. This current is controlled by a relay or relay device 33 which in turn is actuated by variation of resistance between two electrodes 34 and 35 placed in tank 17. These electrodes pass through an insulating plug 36 and are in electrical connection with relay device 33. I may use any one of several well known relay devices for controlling the operation of the solenoid valve as long as such device can be so adjusted that it will close the solenoid valve when the resistance between the electrodes reaches a value corresponding with highest desired concentration of the dilute solution in tank 17. In the operation of this device, the main fluid flows through the main conduit; a small portion of this fluid, say 1%, is deflected through the by-pass; as this shunted fluid enters the displacement tank at 16, it forces or displaces an equal amount of dilute solution at the other side of the tank at point 18 which passes up and joins the main flow in conduit 10. Just as soon as the active ingredient in the displacement tank is reduced in percentage below a predetermined point, the resistance between the electrodes, thru the relay, causes the solenoid valve 32 to open. The opening of this solenoid valve, enables the fluid contained in the by-pass to exert a pressure thru pipe 28 upon the top surface of the concentrated "treatment solution" contained in the reservoir 23 which forces a small quantity of the solution thru nipple 25 into the untreated fluid in the by-pass. The treatment ingredient is in this way carried into the displacement tank 17 where it reenforces the previously impoverished dilute solution; this reenforcing continues until the concentration of the active ingredient in the dilute tank 17 reaches a predetermined high value when further addition is stopped automatically thru the closing of the solenoid valve by the relay actuated by the decrease in the resistance between the two electrodes 34 and 35. Before starting the use of the method and the feeding device it is necessary to calibrate the control electrical mechanism so that the solenoid valve operates between two predetermined points corresponding to a desired range in the resistances between the electrodes. In this way the solution in the displacement tank is maintained at a desired concentration—the variation from which can be made as small as desired.

A practical advantage of this method of control is that it is possible to make quick changes in the ratio of ingredients to be injected into the main flow. This may be accomplished for any system and for given settings of control valves by inserting a resistance in series with the electrodes and calibrating the operation of the feeder against the points of the above variable resistance. After this calibration, all that is required to change the ratio of treatment is to turn the knob of the variable resistance to the desired point on the dial.

In designing installation, the size of the orifice, the setting of control valves 21 and 31, the size of the displacement tank 17, relative sizes of the main and by-pass conduits, the desired ratio of the treatment, all must be considered. In general the orifice diameter can be conveniently selected at one-half (or slightly more) than the diameter of the main conduit. The by-pass pipe diameter should be such that with the above selected orifice and the control valve 21 opened preferably at least one-quarter of the full opening, the ratio of amount of by-pass flow to the quantity of the main flow is not too small. Convenient ratio is about 1:100. This ratio with the desired concentration of the active "treatment ingredient" in the main flow determines the concentration of the dilute solution in the displacement tank 17. The size of tank 17 is such that the concentration of the solution in it can be maintained constant with a convenient frequency of opening and closing of the solenoid valve. I have found it a convenient procedure to select the tank so that the solenoid valve is opened for 15 seconds in every minute. The diameter of nipple 25 and the size of the opening at 26 are selected so that the fluid in by-pass loop will not regurgitate back thru the nipple when the solenoid valve is closed. For example, I have found that with a five gallon reservoir and a half inch nipple (25), an opening of one-eighth of one inch in diameter prevented all regurgitation.

The above are general suggestions, but for any case it is necessary to make a few tests to select the most convenient and preferred sizes of the elements. In the mechanical structure of my device I prefer to inject the concentrated solution into the by-pass so that the two fluids mix thoroughly before they enter the displacement tank. If, for some particular reason, it becomes more advisable to enter the concentrated solutions directly into the displacement tank 17, this should be effected in such a way that the latest addition of the concentrated liquid shall mix thoroughly with the dilute solution already present in the displacement tank 17. This may, for example, be accomplished by baffling arrangement.

Further, I prefer to enter the loop into tank 17 at a point (16) above the top of the reservoir 24 so that at no time can it be possible for the concentrated solution to syphon over into the dilute tank 17 because of some unusual hydrostatic condition in the system.

Although I have described a preferred form of a device for accomplishing the new method for treating a fluid in motion, several changes can be made without affecting either the operation of my method, device or the invention thereof.

For example, I may substitute the orifice used in the main conduit by a Venturi tube, Pitot tubes or an ordinary valve and in some cases with proper arrangement the by-passing can be accomplished without the use of any constriction device.

Instead of employing the two control valves 21 and 32, I may use interposed plates with definite openings.

Further, instead of utilizing variations in resistance of solution in displacement tank 17, I may take advantage of a variation in specific gravity to control the opening and closing of the solenoid valve 32. Thus a small metallic float may be so weighted that it will rise when the density reaches a certain value. This vertical rise occurs in a constrained vertical direction directly under two electrodes. As the float reaches or nearly reaches the electrodes, the resistance between the electrodes is diminished which may be utilized to operate the solenoid valve thru a proper relay device.

Electrodes in the above float method may be entirely omitted and instead a valve needle head may be attached to the top of the float which, when the float rises, closes a small valve seat opening and shuts off a supply of concentrated solution into tank 17.

From the description of the method and device that I employ in this invention, it will be noted that I have attained my objectives and eliminated the errors of the "by-pass" methods used heretofore, by making two essential improvements. First, I have excluded the entire body of the heavy concentrated solution from the path of the by-pass thus keeping the resistance to the said flow constant for any particular amount of main flow. Second, I maintain constant the composition of the dilute solution which the by-pass fluid has to displace and carry into the main conduit.

The cooperation of these two improvements results in a continuous displacement of the same amount of dilute solution of constant composition for any given flow in the main conduit thus effectuating the addition of the "treatment substance" in predetermined desired ratio to the quantity of the main flow. The accuracy of my method and device is equal to the accuracy of the orifice system used.

Finally, a great advantage resulting from the accuracy and dependability of my feeding mechanism is that it becomes unnecessary to give as much attention to its operation as to other forms of by-pass feeders. This advantage coupled with the safety features discussed in the specification eliminates the necessity of frequent servicing of my feeder.

While I have described in detail one preferred illustration of my device and method, it will be understood that I do not limit my present invention to that specific form and procedure described in the above specification or specifically covered by my claim.

What I claim and desire to secure by Letters Patent is:

Apparatus for adding, continuously and automatically, a predetermined proportion of a substance to a flowing liquid; said apparatus comprising a conduit through which said liquid is caused to flow, and a by-pass system for diverting a portion of said flowing liquid at one point of said conduit, introducing said substance thereinto and then introducing the resulting mixture into said conduit at a subsequent point, said system comprising a reservoir for a relatively concentrated dispersion, heavier than the flowing liquid, a tank, a passage for admitting the diverted liquid to said tank, a branch leading from said passage into the upper portion of said reservoir, a second passage leading from the lower portion of said reservoir into said first passage, a third passage leading from said tank into said conduit, a valve, electrically operated, in said branch, a source of electricity to energize said valve, an electrode system positioned in said tank, a source of electricity connected to pass a current through said electrode system and a third circuit interrelating the above valve operating circuit and the said electrode circuit so that the valve is caused to open when the electrode current decreases to a predetermined magnitude and to close at a slightly increased predetermined magnitude, the variation between the two magnitudes corresponding to the allowable tolerance of variation in the composition of the mixture in the tank.

VICTOR P. GERSHON.